United States Patent [19]

Miura

[11] 4,179,720

[45] Dec. 18, 1979

[54] MAGNETIC RECORDED INFORMATION REPRODUCING APPARATUS

[75] Inventor: Yoshimasa Miura, Yokohama, Japan

[73] Assignee: Fujitsu Limited, Japan

[21] Appl. No.: 796,458

[22] Filed: May 12, 1977

[30] Foreign Application Priority Data

May 13, 1976 [JP] Japan .................. 51-54734

[51] Int. Cl.² .................. G11B 5/30; G11B 21/10
[52] U.S. Cl. .................. 360/113; 360/77
[58] Field of Search .................. 360/113, 77, 75

[56] References Cited

U.S. PATENT DOCUMENTS

| | | | |
|---|---|---|---|
| 3,947,889 | 3/1976 | Lazzari | 360/113 |
| 4,012,781 | 3/1977 | Lin | 360/113 |

FOREIGN PATENT DOCUMENTS

2627002  6/1976  Fed. Rep. of Germany .............. 360/77

OTHER PUBLICATIONS

Lin, et al., "Resistance... Elements", IBM Tech. Disc. Bull., vol. 17, No. 11, Apr. 1975, p. 3437.

O'Day, "Balanced Magnetic Head", IBM Tech. Disc. Bull., vol. 15, No. 9, Feb. 1973, p. 2680.

*Primary Examiner*—Robert S. Tupper
*Attorney, Agent, or Firm*—Staas & Halsey

[57] ABSTRACT

A magnetic head in which two magnetoresistive elements are disposed in parallel to patterns recorded on a magnetic recording medium and spaced apart from each other by a distance shorter than a minimum interval of the recorded patterns, the magnetoresistive elements being each disposed between adjacent ones of magnetic shields through an insulator. A magnetic recorded data readout device employs the magnetic head and generates an output proportional to a composite difference resistance obtained by differentially combining resistance variations of the two magnetoresistive elements. A device is provided for detecting the position of magnetization transition of the recorded pattern and the direction of relative movement of the magnetic head to the magnetic recording medium from the zero cross point, and the direction of inclination of the waveform of the output generated by the magnetic recorded data readout device.

10 Claims, 15 Drawing Figures

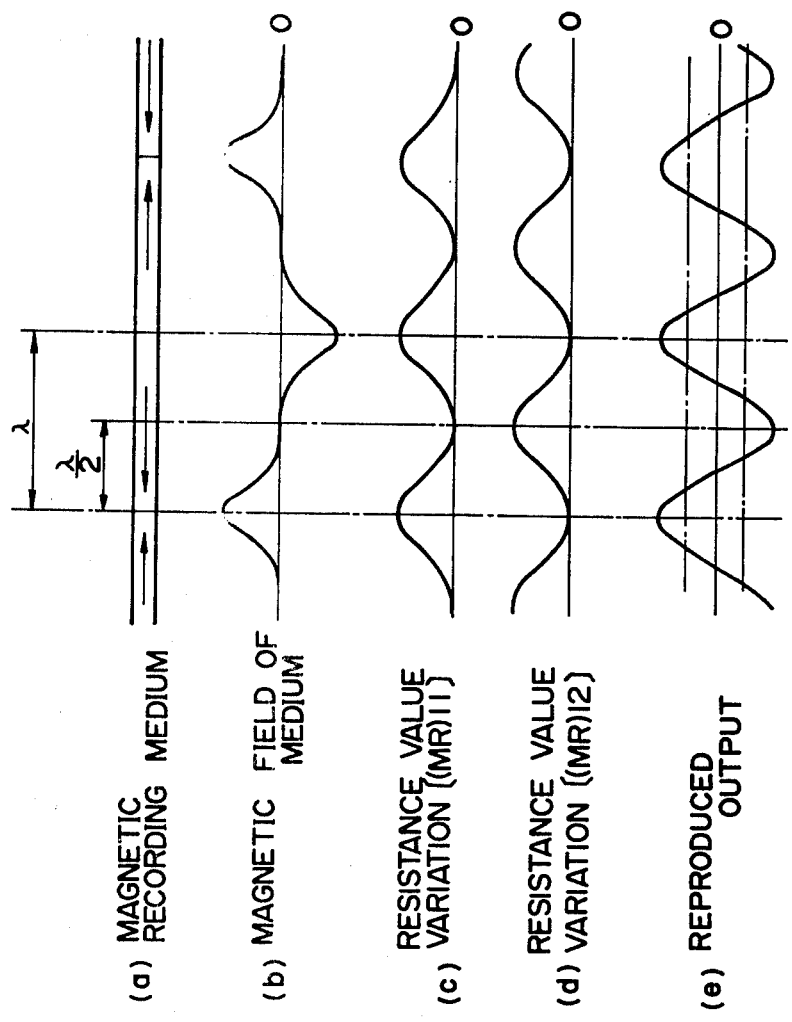

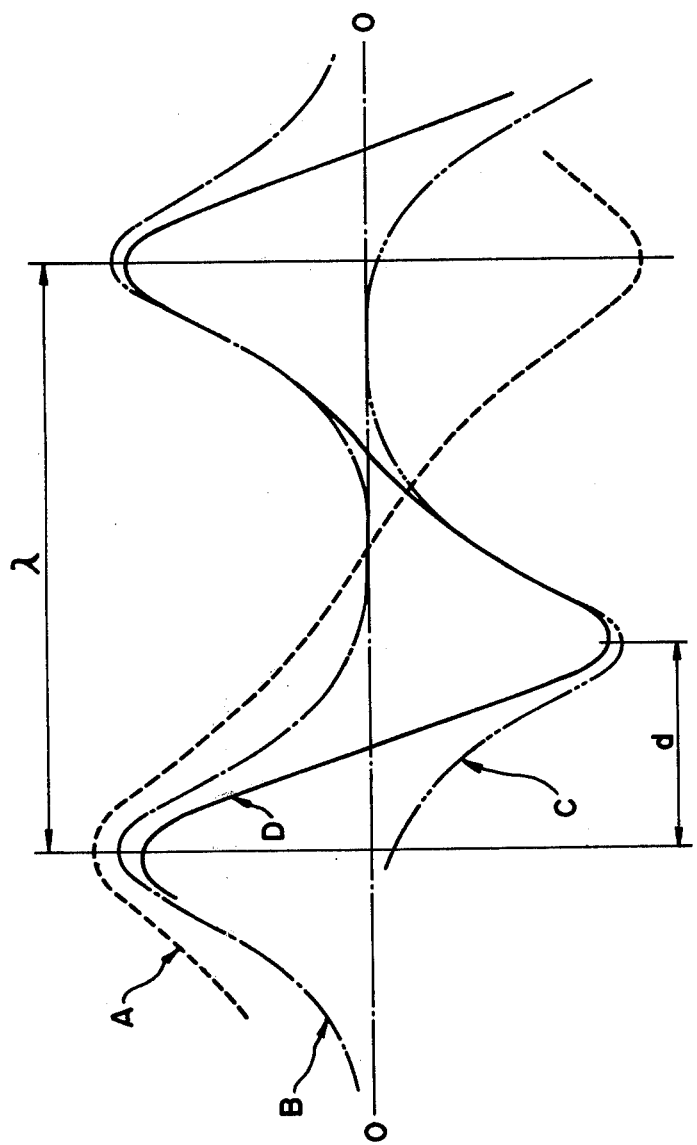

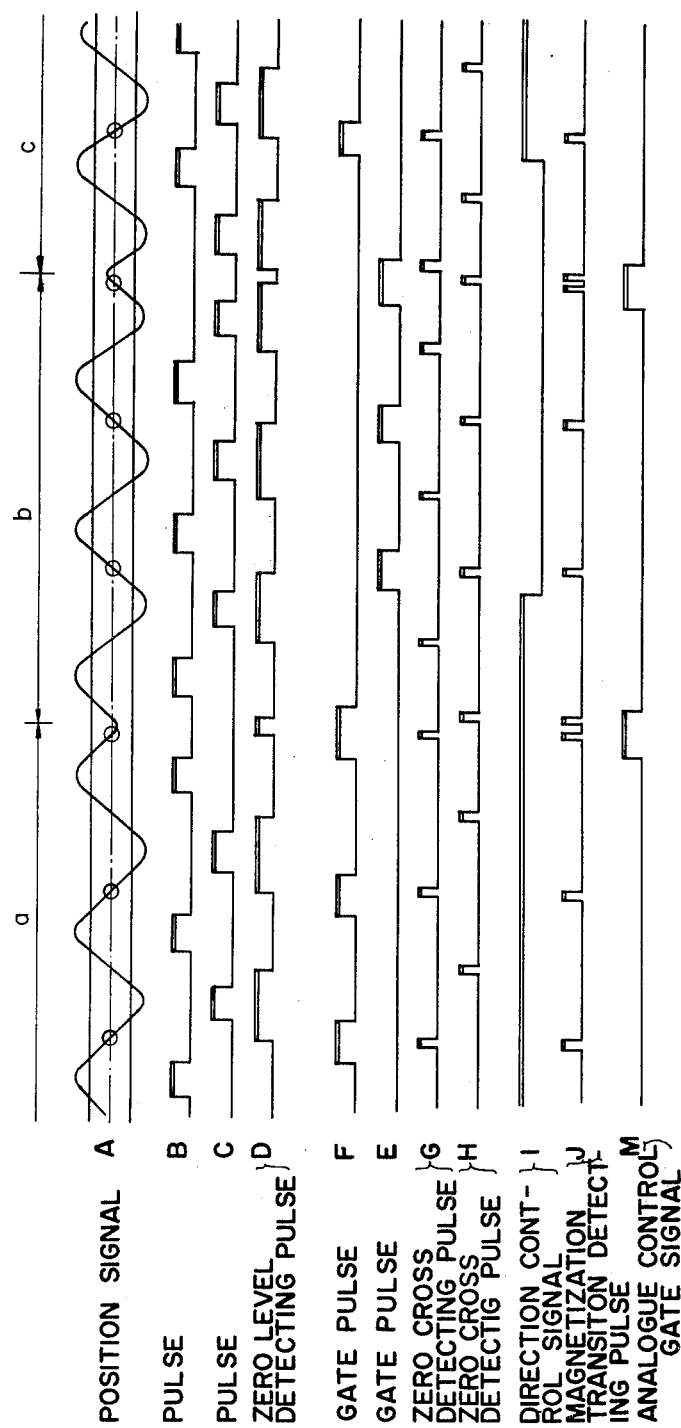

MAGNETIC RECORDED INFORMATION REPRODUCING APPARATUS

BACKGROUND OF THE INVENTION

1. Field of the Invention

This invention relates to a magnetic head which employs two magnetoresistive elements having a magnetoresistive effect such that their resistance values vary with an external magnetic field intensity, a device for reading out magnetically recorded information on a magnetic recording medium by the use of the magnetic head, and a device for detecting the position of a magnetization transition of recorded pattern on the magnetic recording medium and the direction of relative movement of the magnetic head with respect to the magnetic recording medium.

2. Description of the Prior Art

Conventional magnetic heads are usually induction-type. The output from the induction type magnetic head is dependent upon the speed of magnetic field variations, that is, the relative velocity of the magnetic head with respect to a magnetic recording medium. In the case of reproducing a digital magnetic record by the induction type magnetic head, processing such, for example, as differentiation of the output waveform to detect its zero cross point is needed for detecting the peak positions of the output waveform since the reproduced information exists in correspondence to the peak position of the output waveform. Further, in the case of a positioning control employing the induction type magnetic head and a magnetic record on a magnetic recording medium, variations in the relative speed between the magnetic head and the magnetic recording medium results in an unstable output and, when the magnetic head and the recording medium stand still relative to each other, it is entirely impossible to detect whether or not the information lies at the position corresponding to the peak of the output waveform.

On the other hand, a magnetoresistive element or semiconductor element, which changes its resistance value in response to a magnetic field, produces an output corresponding to the magnetic field and, in this case, the variation of the resistance value is not dependent upon the relative velocity between the recording medium and the magnetic head. Accordingly, this element is suitable for use in the abovesaid positioning control. With a conventional magnetic head employing a single magnetoresistive element, however, even if linearization of the output can be easily achieved since the position of magnetization transition on the magnetic recording medium is detected as the peak position of the output waveform, it is necessary to detect the peak position of the output waveform by differentiation for reproducing a position signal. And such a conventional magnetic head is not suited for use in the detection of a steady state location on the recording medium, and cannot provide information on the direction of movement.

SUMMARY OF THE INVENTION

An object of this invention is to provide a magnetic head which employs two magnetoresistive elements to suppress an output waveform distortion due to drifting of a bias magnetic field and which is stable in operation and simple in structure.

Another object of this invention is to provide a magnetic recorded data readout device for reading out a magnetic record from a magnetic recording medium by simultaneously detecting the outputs from the two magnetoresistive elements of the abovesaid magnetic head.

Still another object of this invention is to provide a device for detecting the position of magnetization transition of a recorded pattern on a magnetic recording medium from the zero cross point and the direction of inclination of a composite output waveform of the outputs from the two magnetoresistive elements in the above-said readout device.

Briefly stated, the magnetic head of this invention is characterized in that two magnetoresistive elements, which have the magnetoresistive effect such that their resistance values vary with the intensity of an external magnetic field, are disposed in parallel to the direction of patterns previously recorded on a magnetic recording medium and spaced apart a distance shorter than a minimum pattern interval. The magnetic recorded data readout device of this invention is characterized in that magnetic recorded information on a magnetic recording medium is read out by differentially combining two outputs from the two magnetoresistive elements. Further, the magnetization transition position detecting device of this invention is characterized in that the position of magnetization transition of a recorded pattern on the magnetic recording medium, and the direction of relative movement between the magnetic head and the magnetic recording medium are detected by the combined use of means for detecting the point at which a composite output waveform of the above-said magnetic recorded data readout device crosses the zero level, and in that there is provided means for detecting the direction of inclination of the composite waveform at the zero cross point.

BRIEF DESCRIPTION OF THE DRAWINGS

FIG. 6 is a timing chart showing the operation of the magnetic recorded data readout device shown in FIG. 5;

FIG. 8 is an explanatory diagram showing the generation of a zero cross point;

FIG. 14 is a timing chart in the case of the positioning control device shown in FIGS. 12 and 13.

DESCRIPTION OF THE PREFERRED EMBODIMENTS

Figure 1:
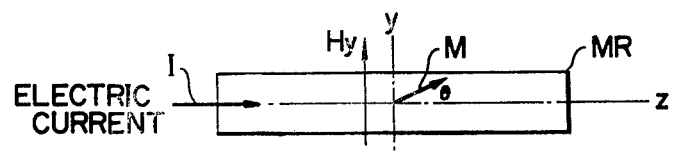
FIG. 1 is a diagram explanatory of the relationship between a magnetic field and a current in a magnetoresistive element.
Figure 2:
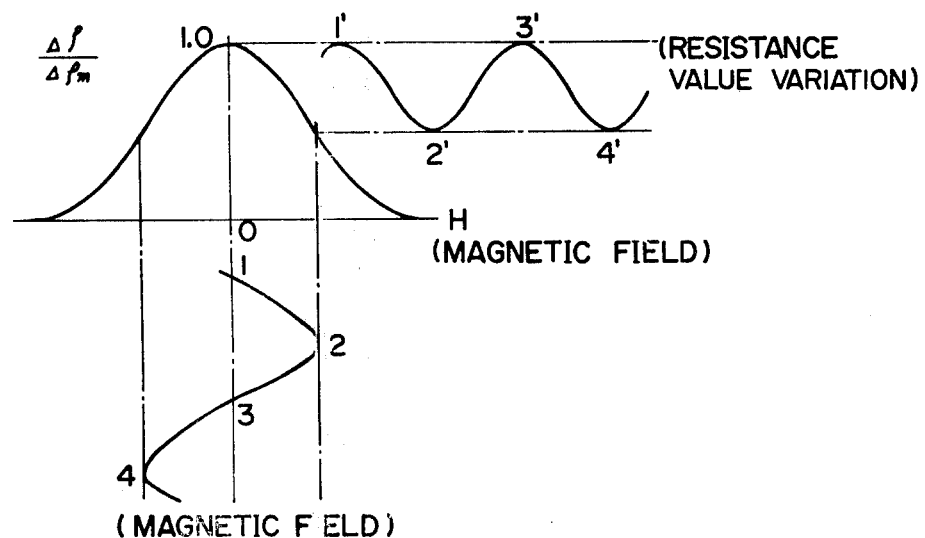
FIG. 2 is a diagram explanatory of the generation of a unipolar output in the magnetoresistive element.
Figure 3:
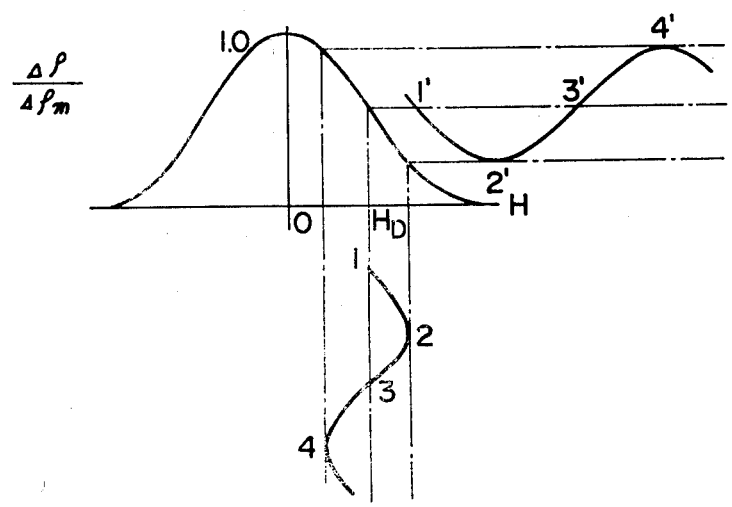
FIG. 3 is a diagram explanatory of the generation of a linearized output in the magnetoresistive element.

Some of ferromagnetic metals which have the uniaxial anisotropy, such as permalloy and so on, present such anisotropy that, letting the angle between the current vector I and the magnetization vector M be represented by $\theta$, the resistance value is as follows;

$$\rho = \rho_0 + \Delta\rho_m \cos^2 \theta \qquad (1)$$

where $\rho$ is an isotropic resistance value and $\Delta\rho_m$ is a resistance variation, which accounts for several percent of the isotropic resistance value $\rho_0$ in permalloy, NiCo, etc. Now, a magnetoresistive element MR is disposed with its axis of easy magnetization aligned with the direction of current (Z-direction), as shown in FIG. 1. When a magnetic field Hy is applied across the magnetoresistive element MR, the resistance variation is given as a function of the magnetic field Hy, as follows:

$$\rho = \rho_0 + \Delta\rho_m(1 - (Hy^2/Hs^2)) \qquad (2)$$

where Hs is the saturation magnetic field of the magnetoresistive element MR. When such a magnetic head system is exposed to a bipolar magnetic field 1-2-3-4- . . . such as depicted in FIG. 2, the resulting resistance value variation becomes a unipolar output indicated by 1'-2'-3'-4' . . . May of the ordinary magnetic heads are expected to achieve a linear response, and linearization of the magnetoresistive element may be accomplished by applying a suitable bias magnetic field, as shown in FIG. 3. Examples of using the magnetoresistive element as a magnetic head by such a method are disclosed, for example, in U.S. Pat. No. 3,493,694 and so on. But since these conventional magnetic heads are of a recorded data detecting system employing a magnetoresistive element, they have unstable factors such, for example, as the generation of a waveform distortion due to a drift of the bias magnetic field.

Figure 4A:
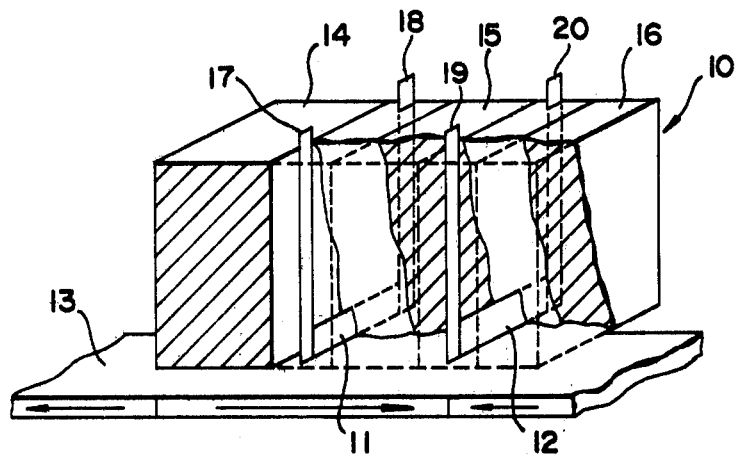
FIGS. 4A and B are schematic diagram illustrating an embodiment of a magnetic head of this invention.

FIGS. 4A and B are a perspective view, and a longitudinal sectional view, both partly cut away, illustrating the structure of an embodiment of this invention. In FIGS. 4A and B, the magnetic head comprises two thin film magnetoresistive elements (MR) 11 and 12 as of the aforesaid ferromagnetic metal having the uniaxial anisotropy, which magnetoresistance elements are each held between adjacent ones of magnetic shields 14, 15 and 16 through insulators, and disposed in parallel to information patterns recorded on a magnetic recording medium 13 and spaced a distance d apart from each other. The element spacing d is selected to bear a specific relationship with a minimum pattern spacing $\lambda$ of the information patterns recorded on the magnetic recording medium 13 according to each particular use of the device. For example, in the case of producing a position signal, the spacing $d=\lambda/2$ or its odd-number multiple provides maximum resolution. In the case of demodulation, $d=\lambda/2$ is convenient. Reference numerals 17, 18 and 19, 20 indicate electrodes of the magnetoresistive elements 11 and 12, respectively.

Especially when requiring a high degree of resolution, the magnetic shields 14, 15 and 16 are respectively disposed between the magnetoresistive elements 11 and 12 and on the outsides thereof with suitable air gaps defined therebetween, respectively.

Figure 4B:
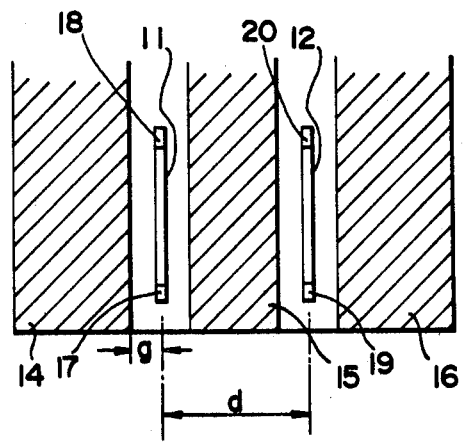

The magnetic head having such a structure as shown in FIG. 4A can be manufactured highly accurately and easily by multilayer thin film pattern-forming techniques. An example of the steps involved in the manufacture of the magnetic head by such techniques will hereunder be described in brief with reference to FIG. 4B.

(1) The magnetic shield 14 is formed on a suitable substrate by means of electroplating or vacuum evaporation.

(2) An insulating layer is deposited to a thickness g.

(3) The magnetoresistive element 11 and an electrode pattern are formed to a thickness t as by photo etching.

(4) An insulating layer is deposited to the thickness g.

(5) The second magnetic shield 15 is formed to a thickness d-2g-t.

(6) An insulating layer is deposited to the thickness g.

(7) The magnetoresistive element 12 and an electrode pattern are formed as by photo etching.

(8) An insulating layer is deposited to the thickness g.

(9) The magnetic shield 16 is formed.

(10) After being provided with a protective coating, the assembly is molded into a suitable magnetic head configuration.

Where a magnetic material is used for the substrate, the step (1) can be left out. The magnetic head thus produced can be used not only in the type contacting with the magnetic recording medium but also in the type floating above the recording medium.

Figure 5:
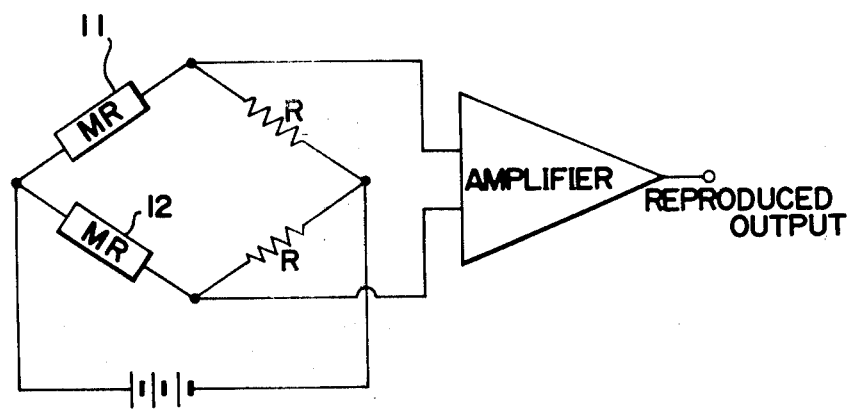
FIG. 5 is a block diagram showing an example of a magnetic recorded data readout device employing the magnetic head of this invention.

Next, a description will be given with regard to apparatus for reading out recorded information patterns from the magnetic recording medium by the two-element magnetic head of this invention. The two-element magnetic head of this invention is characterized in that signals derived from the two magnetoresistive elements are combined by a bridge circuit to reproduce an information pattern, as illustrated in FIG. 5. The bridge circuit is designed to be in its equilibrium state when the magnetoresistive elements (MR) 11 and 12 both do not detect any magnetic fields. When the both magnetoresistive elements 11 and 12 sense magnetic fields so as to change their resistance values by $\Delta\rho_1$ and $\Delta\rho_2$, respectively, the output from the bridge circuit, amplified by an amplifier, is as follows:

$$V\alpha(\Delta\rho_1 - \Delta\rho_2) \qquad (3)$$

which is proportional to the difference between the resistance value variations $\Delta\rho_1$ and $\Delta\rho_2$.

Turning now to FIG. 6, a specific operative embodiment of this invention will be described in connection with the case where the recorded information pattern spacing is $\lambda$ and the distance between the two magnetoresistive elements is $d=\lambda/2$. Let it be assumed that the magnetic recording medium has recorded thereon patterns having a magnetization transition interval $\lambda$, as shown in FIG. 6(a). On the surface of the magnetic recording medium, a vertical magnetic field is generated as depicted in FIG. 6(b). Since the magnetoresistive elements are not treated for linearization as by application of a bias magnetic field in such a manner as shown in FIG. 2. The resistance values of the magnetoresistance elements (MR) 11 and 12 undergo such changes as are shown in FIGS. 6(c) and (d), respectively. As the output from the bridge circuit follows the formula (3), it becomes such as depicted in FIG. 6(e) in proportion to the difference between the resistance value variations shown in FIGS. 6(c) and (d).

The reproduced output depicted in FIG. 6(e), obtained by the system of this invention, can be used for a variety of purposes. For instance, the output from the magnetoresistive element is not dependent upon the relative velocity of the magnetic recording medium to the magnetic head. Accordingly, this invention can be widely applied to the formation of a positioning signal of a servo device and so on. Also, it is possible to provide a novel data demodulation system in which the magnetic head of this invention is employed for reading out data from a magnetic disc or the like.

Figure 7:
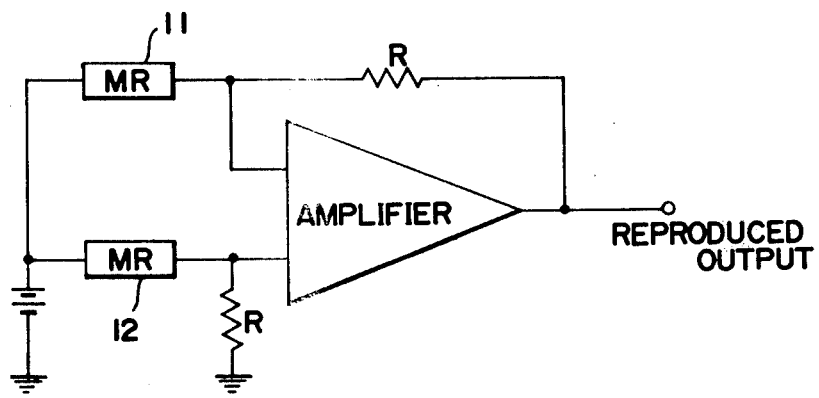
FIG. 7 is a block diagram illustrating another example of the magnetic recorded data readout device employing the magnetic head of this invention.

FIG. 7 shows an example in which the magnetic head of this invention is used in practice, and in which the difference between the outputs from the magnetoresistive elements in FIGS. 6(c) and (d) is picked up as a reproduced output through an operational amplifier.

Next, a description will be made with respect to an embodiment of an apparatus for detecting the magnetization transition of a recorded pattern on the magnetic recording medium by the use of the readout device shown in FIG. 5.

Now, let it be assumed that the magnetic recording medium has written therein data of the recorded pattern spacing λ, as shown in FIG. 8. Reproducing the data by an ordinary induction type magnetic head, a waveform, for example, indicated by A, is obtained. This is, the pattern information lies at the peak of this waveform. On the other hand, the output from the magnetic head, which employs the magnetoresistive elements having the characteristic given by the formula (2), is, in an ideal case, a unipolar output such as indicated by a waveform B, and the pattern information also lies at the peak position. In the case of employing the aforesaid magnetic head so that the distance between the two magnetoresistive elements is d ($d \leq \lambda/2$), the output from the amplifier in FIG. 5 is given by the formula (3). Accordingly, assuming that the resistance variation $\Delta\rho_1$ of the magnetoresistive element 11 is given by the waveform B in FIG. 8, the resistance change $\Delta\rho_2$ of the magnetoresistive element 12 is given by the waveform C displaced from the waveform B by d. From the relation given by the formula (3), the output from the two-element magnetic head in this case is indicated by the waveform D and the information of magnetization transition is contained in the zero cross point at the cross point which lies at the center of the output waveform of the two-element head.

Figure 9:
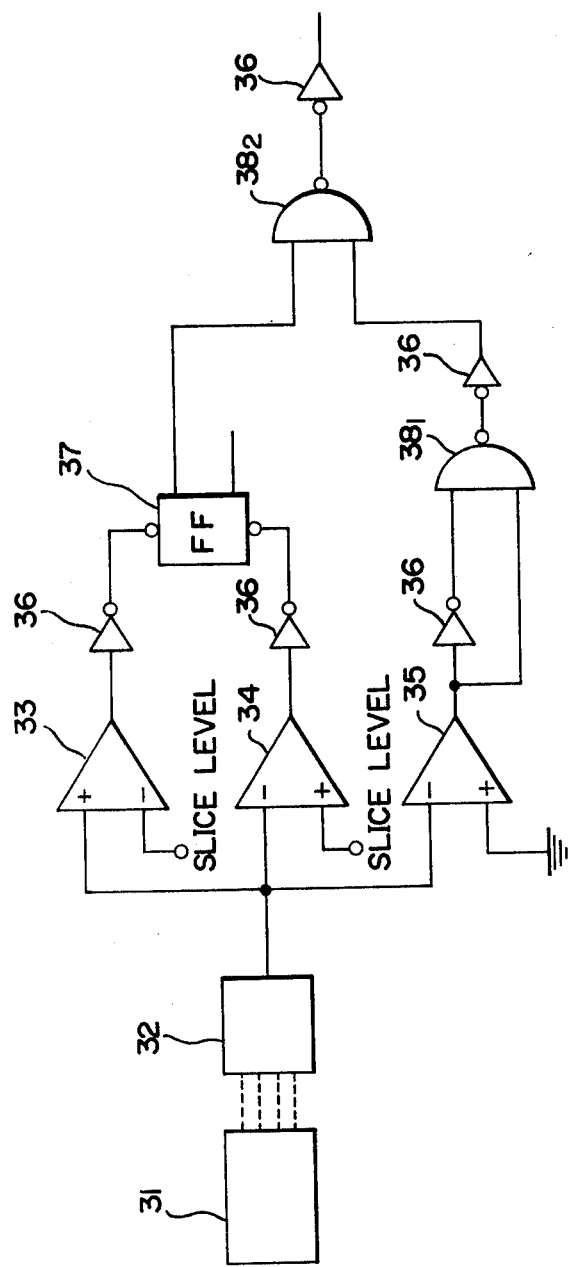
FIG. 9 is a block diagram illustrating the structure of a magnetization transition position detecting device of this invention.

FIG. 9 illustrates in block form a rightwardly falling zero level detector for detecting a data pulse from the output from the bridge circuit.

Figure 10:
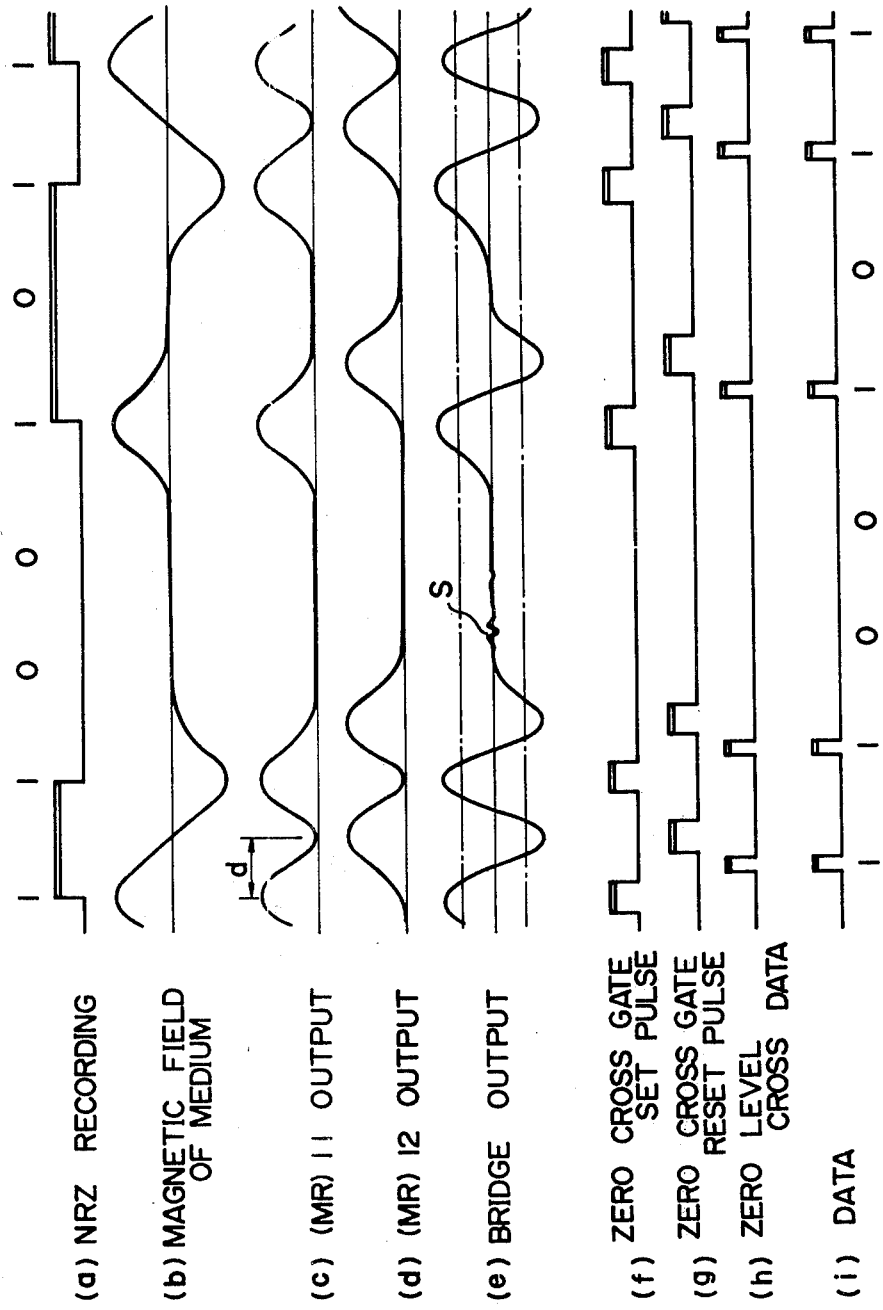
FIG. 10 is a timing chart in the case where a data of the NRZI recording method is applied to this invention.

FIG. 10 is a timing chart in the case where the data recorded by the NRZI recording method is reproduced based on the detecting method of FIG. 9.

With reference to FIG. 10, the method of FIG. 9 will be described.

In FIG. 9, reference numeral 31 indicates a two-element magnetic head, and 32 designates a block composed of a bridge circuit and an amplifier, the combination of them indicating FIG. 5. Assume that the magnetic recording medium has recorded thereon such a data as shown in FIG. 10(a). The vertical magnetic field on the magnetic recording medium in such a case is as depicted in FIG. 10(b). Since the resistance variation of the magnetoresistive element is unipolar, the output from the magnetoresistive element 11 becomes such as shown in FIG. 10(c) and the output from the magnetoresistive element 12 becomes such a waveform as shown in FIG. 10(d) which is displaced from the output waveform of the element 11 by d. The bridge output from the bridge-amplifier 32 becomes the difference between the outputs from the magnetoresistive elements 11 and 12, depicted in FIGS. 10(c) and (d), to obtain the waveform of FIG. 10(e), as given by the formula (3). This waveform has the feature that the zero level is stable since it is the bridge output. For demodulating the data from such a waveform, the output from the bridge-amplifier 32 is branched into three and a slice level is set by a level comparator 33 to detect a positive peak to produce a zero cross position detecting gate set pulse such as shown in FIG. 10(f). Next, a negative peak is similarly detected by a level comparator 34 to produce such a zero cross position detecting gate reset pulse as shown in FIG. 10(g). By the waveforms of FIGS. 10(f) and (g), a gate can be opened only at the position corresponding to the position of magnetization transition. Further, the point at which the waveform of the bridge output of FIG. 10(e) crosses the zero level is detected by a level comparator 35 to obtain a zero level cross data shown in FIG. 10(h). In the case of the waveform of the bridge output shown in FIG. 10(e), when noises are superimposed on the output in the region in which the waveform rises rightwardly and the zero level continues, the level comparator 34 generates a pulse. But in the region in which the waveform rises rightwardly, the gate is closed, so that the noise generation does not matter.

To perform this, the outputs from the level comparators 33 and 34 are respectively applied to set and reset terminals of a flip-flop 37 through inverters 36 and 56, respectively, to open an NAND gate $38_2$ only during setting of the level comparator 33 and resetting of the level comparator 34. On the other hand, the output from the level comparator 35 is applied to an NAND gate $38_1$ directly and through an inverter 66, and the output from the NAND gate $38_1$ is applied to another inverter 76 for pulse formation to obtain the zero level cross data shown in FIG. 10 (h). The output thus derived from the inverter 76 is further applied to the NAND gate $38_2$ and then to the inverter 86 to obtain a data pulse, by which the codes of the NRZI recording method are demodulated.

In the illustrated embodiment, the bridge structure is such that the magnetoresistive elements (MR) are connected in the order of 11 and 12, and the zero level detecting system is the rightwardly falling one. But in the opposite case, a rightwardly rising zero level detecting system is employed.

Since the two-element magnetic head is capable of easily detecting the position of magnetization transition as set forth above, it can also be employed for the demodulation of data of another recording method such, for instance, as the MFM (Modified FM) recording method.

Figure 11:
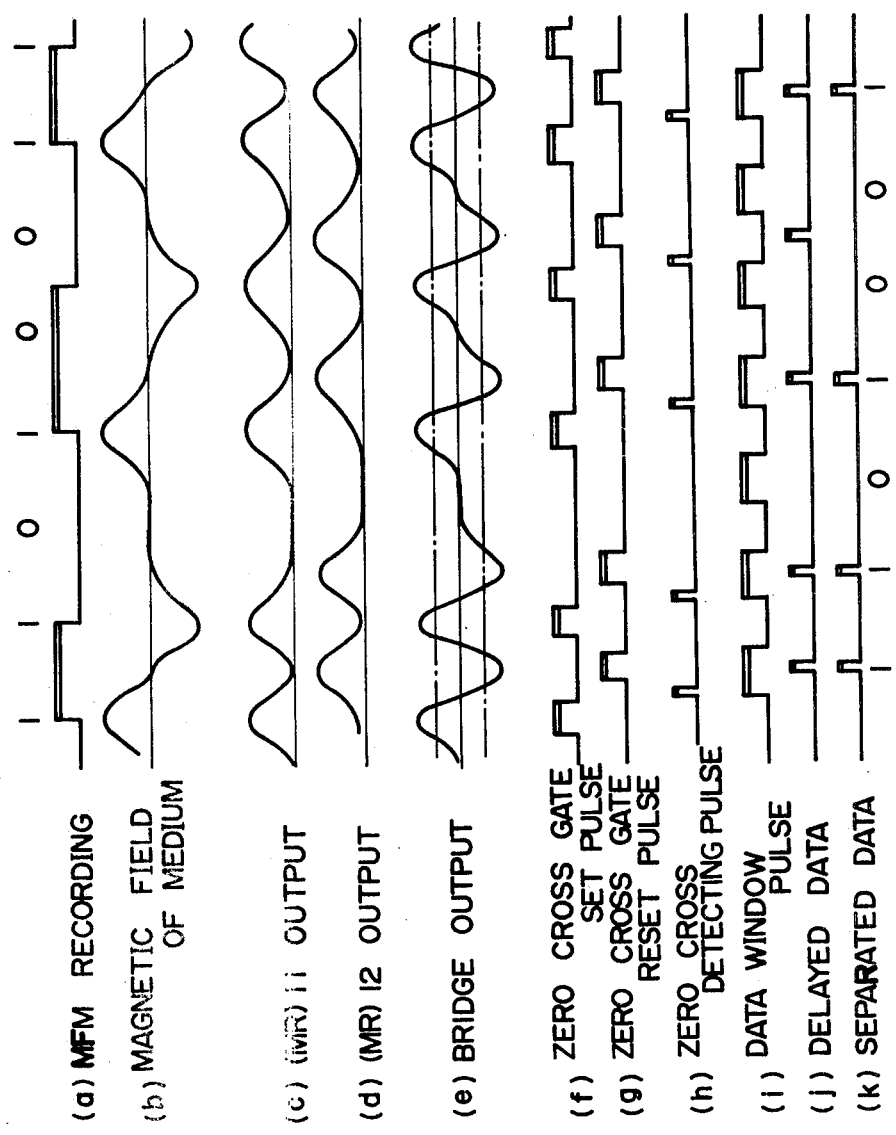
FIG. 11 is a timing chart in the case where a data of the MFM recording method is applied to this invention.

FIG. 11 is a timing chart for data demodulation in the case of the MFM recording method. That is, as is well-known in the art, in the MFM recording method, the zero cross detecting pulse is composed of data and clock pulses, so that the step of removing the clock pulses is required for data detection. In FIGS. 11(a) to (h), the zero cross detecting pulse is produced in the same manner as in the case of the NRZI recording method shown in FIG. 10. The step for removing the clock pulses from the zero cross detecting pulse is as follows: That is, a data window pulse shown in FIG.

11(i) is produced as by a phase locked loop, by which the zero cross detecting pulse of FIG. 11(h) is delayed to obtain a delayed data of FIG. 11(j), and those of the delayed data which lie in the data windows are picked up as a separated data, as depicted in FIG. 11(k). In this manner, the clock pulses are separated, by which the data initially inputted by the MFM recording method can be demodulated completely.

Next, a description will be given of an embodiment in which a positioning control device is constructed using the magnetic head of this invention.

Figure 12:
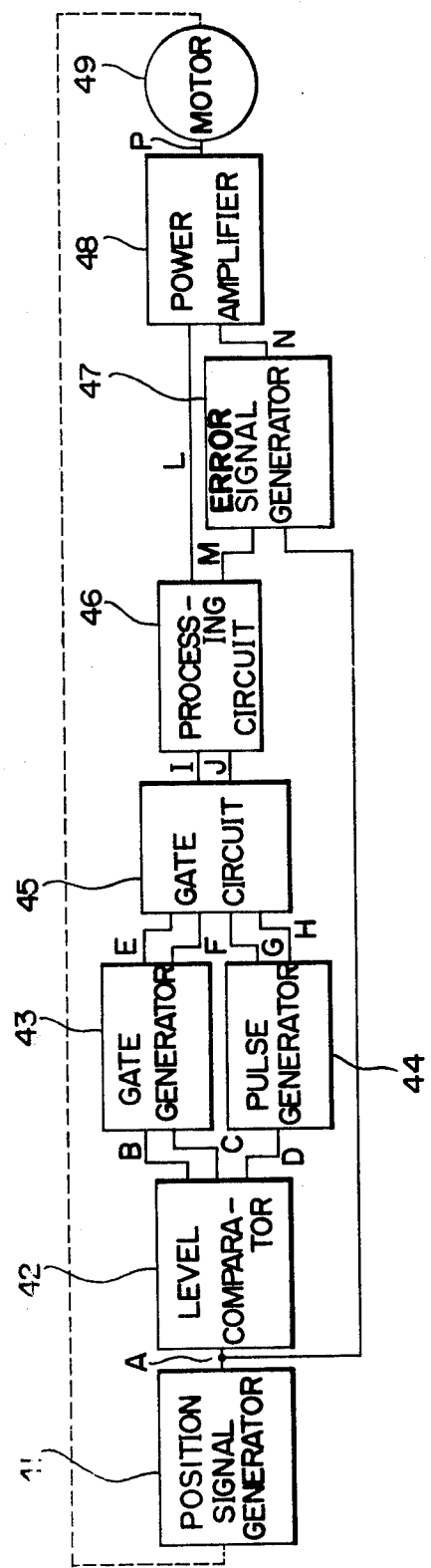
FIG. 12 is a block diagram illustrating the structure of an example of a positioning control device embodying this invention.
Figure 13:
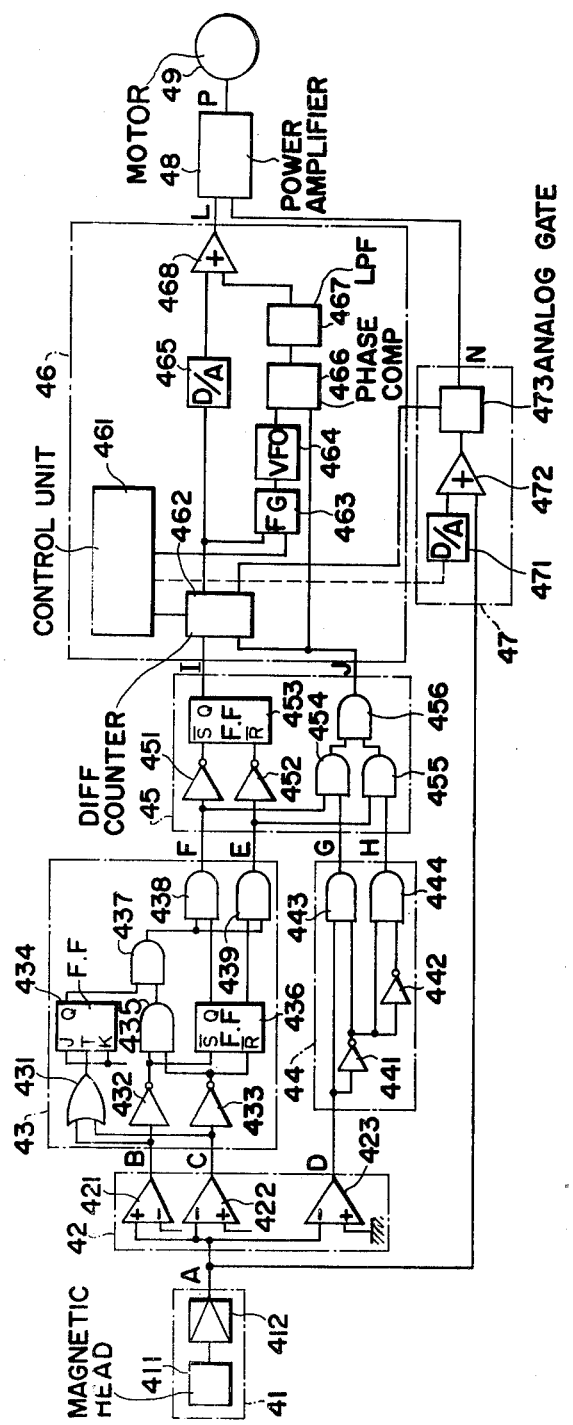
FIG. 13 is a diagram showing in detail the structure of each block depicted in FIG. 12.

FIG. 12 shows the case of employing a servo motor and the two-element magnetic head for accurate positioning and FIG. 13 illustrates in detail the structure of each block in FIG. 12.

In FIGS. 12 and 13, reference numeral 41 indicates a position signal generator, which is composed of the block 411 including the magnetic recording medium 13 and the two-element magnetic head 10 (FIG. 4A), and a bridge circuit structure 412 (such as in FIG. 5); 42 designates a level comparator, which is composed of a positive level comparator 421, a negative level comparator 422 and a zero level comparator 423; 43 identifies a gate generator, which is composed of an OR circuit 431, NOT circuits 432 and 433, a J-K flip-flop 434, AND circuits 435, 437, 438 and 439 and a set-reset flip-flop 436; 44 denotes a pulse generator, which is composed of NOT circuits 441 and 442 and AND circuits 443 and 444; 45 represents a gate circuit, which is composed of NOT circuits 451 and 452, a flip-flop 453 and AND circuits 454, 455 and 456; 46 shows a processing circuit, which is composed of a control unit 461, a difference counter 462, a function generator (FG) 463, VFO 464, a phase comparator 466, a low-pass filter (LPF) 467 and an adder 468; 47 refers to an error signal generator, which is composed of a D-A converter 471, an adder 472 and an analog control gate 473; 48 indicates a power amplifier; and 49 designates a motor.

As is evident from FIG. 8, where the two-element magnetic head 10 moves on the magnetic recording medium in such a direction that the magnetoresistive element 11 precedes the element 12, the point at which the rightwardly falling waveform of the composite waveform D in FIG. 8 crosses the zero level corresponds to the position of magnetization transition. Where the two-element magnetic head 10 moves on the magnetic recording medium in such a direction that the magnetoresistive element 12 precedes the element 11, the point at which the rightwardly rising waveform crosses the zero level corresponds to the position of magnetization transition. Accordingly, the position of magnetization transition can be accurately detected by switching the zero cross detecting gate with a direction control signal. Further, if the element spacing d of the magnetic head bears a suitable relationship with the width of magnetization transition of the magnetic recording medium, there exists in the peak interval d a region in which an appreciable linear response can be expected. Since this is never dependent upon the relative velocity of the magnetic head to the magnetic recording medium, an analog position signal can be obtained, which is one of the features of this invention.

FIG. 14 is a timing chart of main signals in the respective blocks of the positioning control system shown in FIGS. 12 and 13. The position signal generator 41 is comprised of the magnetic recording medium 13, and the two-element magnetic head 10 in FIG. 4A, and the bridge circuit structure illustrated in FIG. 5. A position signal A generated by the position signal generator 41 is divided into two; one for a digital control and the other for an analog control. In FIG. 14A, there is shown a position signal in the case where the two-element magnetic head which has moved forward segment (a) on the magnetic recording medium having recorded thereon magnetization transitions at proper intervals, moves backward segment (b) from a certain point, and then moves forward segment (c) again. The parts indicated by white circles correspond to the magnetization transition parts.

With reference to FIGS. 12, 13 and 14, the waveform for the digital control forms shaped pulses B and C using suitable positive and negative levels and a shaped pulse D using the zero level in the level comparator 42. In the gate generator 43, a rightwardly rising waveform detecting gate signal E and rightwardly falling waveform detecting gate signal F are derived from the shaped pulses B and C. The pulse generator 44 detects the rise and fall of the zero level detecting pulse D to produce pulses G and H.

In the gate circuit 45, a direction control signal I and a pulse J for detecting the position of magnetization transition are produced from the gate signals E and F and the zero cross detecting pulses G and H. The processing circuit 46 is composed of an interface logic in control unit 461 for an external control signal, a counter 462, a function generator (FG) 463, a VFO 464, a D-A converter 465, etc. according to the control method desired, and performs such processing as digital control for driving a motor 48 to a predetermined position, supplying a motor speed control and an analog control for applying analog servo to a predetermined position, and the formation of control signals.

The operation of digital driving of the motor of the predetermined position will be described. When a difference signal to drive the motor 49 from its present position by ±n steps is set in a register (in the difference counter 462) from the control unit 461, the difference counter 462 adds or subtracts the magnetization transition position detecting pulse J in the register in accordance with the direction control signal I to produce a digital control signal L corresponding to the difference between the desired position and the present position of the motor 49. The digital control signal L is applied to the power amplifier 48, whose output P is supplied to the motor 49. The velocity curve until the motor 49 reaches the predetermined position can be set as desired, and this can be accomplished by the combination of the counter 462 output with the function generator 463. In a specific operative velocity control feedback loop, if it is used in combination with, for instance, a phase locked loop, a velocity control signal can be produced by comparing the VFO 464 output obtained from the processing and the magnetization transition position detecting pulse J with each other in phase.

When the register of the difference counter 462 is reduced to zero, an analog feedback loop is set up to obtain an analog control gate signal M for accurate positioning. It is already mentioned that a differential output substantially proportional to the displacement is obtained in the vicinity of the position of magnetization transition. In the error signal generator 47, the level difference between the position signal A and the zero level or a predetermined level is amplified to an error voltage N, and the amplified output is supplied to the power amplifier 48.

The foregoing has described one example of each of the position and velocity detecting methods employing the two-element magnetic head of this invention. The positioning control device employing the two-element magnetic head according to this invention has the following features:

(1) The analog controllable range is the magnetic head element spacing d regardless of the magnitude of the recorded pattern spacing λ of the magnetic recording medium.

(2) Accordingly, the recorded pattern spacing λ can be altered at will, so that it is sufficient to change only the pattern density for each system used.

(3) The direction and velocity of motion can be detected without using any special circuits therefor.

(4) Since the displacement from the set position is dependent not upon the recorded pattern interval λ but only upon the magnetic head element spacing d, setting of circuits is easy.

As has been described in the foregoing, with the magnetic recorded information reproducing apparatus of this invention, information recorded on a magnetic recording medium can be read out by a magnetic head employing two magnetoresistive elements having such magnetoresistive effect that their resistance values vary with the external magnetic field intensity. Further, the position and direction of magnetization transition of the recorded pattern on the magnetic recording medium can be detected. Accordingly, the magnetic recorded information reproducing apparatus of this invention can be used for the detection of various magnetic recorded data and positioning control, and is very useful.

In the above, the magnetic head is described to employ the magnetoresistive elements, but other elements capable of detecting a magnetic field such, for example, as some kinds of semiconductor elements, can be employed, and this is very easy to one of ordinary skill in the art. Further, the number of magnetic head elements need not always be limited specifically to two, but may also be increased to three or more.

It will be apparent that many modifications and variations may be effected without departing from the scope of the novel concepts of this invention.

What is claimed is:

1. A magnetic recorded information reproducing apparatus for reproducing information in accordance with recorded patterns spaced apart on a magnetic recording medium by a minimum spacing, said apparatus comprising:
two magnetoresistive elements having resistance values which vary in accordance with an external magnetic field intensity, and which are disposed in parallel to the direction of said patterns recorded on said magnetic recording medium, and which are spaced apart from each other by a distance shorter than said minimum spacing of the patterns; and
magnetic shield means disposed between said two magnetoresistive elements and on that respective side of each of said magnetoresistive elements remote from the other magnetoresistive element for preventing magnetic coupling between said two magnetoresistive elements;
said magnetic shield means comprising shields disposed in spaced relationship to said magnetoresistive elements so as to form respective air gaps surrounding each magnetoresistive element;
said respective air gaps surrounding each magnetoresistive element comprising insulator means for electrically insulating each of said magnetoresistive elements from the other of said magnetoresistive elements so as to preclude electrical coupling between said magnetoresistive elements;
whereby to provide said apparatus with high resolution for reproducing magnetic recorded information.

2. A magnetic recorded information reproducing apparatus according to claim 1, which further comprises generating means connected to said two magnetoresistive elements and responsive to resistance variations of the two magnetoresistive elements for generating an output proportional to a composite difference resistance obtained by differentially combining said resistance variations of the two magnetoresistive elements.

3. A magnetic recorded information reproducing apparatus for reproducing information in accordance with recorded patterns spaced apart on a magnetic recording medium by a minimum spacing, said apparatus comprising:
two magnetoresistive elements having resistance values which vary in accordance with an external magnetic field intensity, and which are disposed in parallel to the direction of said patterns recorded on said magnetic recording medium, and which are spaced apart from each other by a distance shorter than said minimum spacing of the patterns;
insulator means, one for each of the two magnetoresistive elements, each insulator means surrounding its respective magnetoresistive element for insulating same; and
magnetic shields respectively disposed between said insulator means and on that respective side of each of said insulator means remote from the other insulator means;
said apparatus further comprising generating means connected to said two magnetoresistive elements and responsive to resistance variations of the two magnetoresistive elements for generating an output proportional to a composite difference resistance obtained by differentially combining said resistance variations of the two magnetoresistive elements;
wherein said recorded patterns include magnetization transitions at corresponding positions in said magnetic recording medium, said transitions including a zero cross point, said output of said generating means comprising a waveform having different directions of inclination, said apparatus further comprising detecting means responsive to said output of said generating means for detecting the position of magnetization transition of the recorded pattern on the magnetic recording medium from the zero cross point and for detecting the direction of inclination of the waveform of the output.

4. A magnetic recorded information reproducing apparatus according to claim 2, wherein said generating means comprises two resistors, each connected to a corresponding one of said two magnetoresistive elements to form a corresponding junction therebetween, and amplifier means having two inputs, each connected to a corresponding one of said junctions, for detecting and differentially combining said resistance variations of the two magnetoresistive elements.

5. A magnetic recorded information reproducing apparatus for reproducing information in accordance with recorded patterns spaced apart on a magnetic recording medium by a minimum spacing, said apparatus comprising:

two magnetoresistive elements having resistance values which vary in accordance with an external magnetic field intensity, and which are disposed in parallel to the direction of said patterns recorded on said magnetic recording medium, and which are spaced apart from each other by a distance shorter than said minimum spacing of the patterns;

insulator means, one for each of the two magnetoresistive elements, each insulator means surrounding its respective magnetoresistive element for insulating same; and magnetic shields respectively disposed between said insulator means and on that respective side of each of said insulator means remote from the other insulator means, said apparatus further comprising generating means connected to said two magnetoresistive elements and responsive to resistance variations of the two magnetoresistive elements for generating an output proportional to a composite difference resistance obtained by differentially combining said resistance variations of the two magnetoresistive elements, wherein said magnetoresistive elements each have first and second terminals, said generating means comprising a D.C. source connected in series with said first terminal of each of said magnetoresistive elements, amplifier means having two inputs, each connected to said second terminal of a corresponding one of said magnetoresistive elements, for detecting and differentially combining said resistance variations of the two magnetoresistive elements to generate said output proportional to said composite difference resistance, and feedback means connecting said output and a given one of said inputs of said generating means for feeding back said output of said generating means.

6. A magnetic recorded information reproducing apparatus according to claim 5, wherein said feedback means comprises a series-connected resistor.

7. A magnetic recorded information reproducing apparatus for reproducing information in accordance with recorded patterns spaced apart on a magnetic recording medium by a minimum spacing, said apparatus comprising:

two magnetoresistive elements having resistance values which vary in accordance with an external magnetic field intensity, and which are disposed in parallel to the direction of said patterns recorded on said magnetic recording medium, and which are spaced apart from each other by a distance shorter than said minimum spacing of the patterns;

insulator means, one for each of the two magnetoresistive elements, each insulator means surrounding its respective magnetoresistive element for insulating same; and magnetic shields respectively disposed between said insulator means and on that respective side of each of said insulator means remote from the other insulator means, said apparatus further comprising generating means connected to said two magnetoresistive elements and responsive to resistance variations of the two magnetoresistive elements for generating an output proportional to a composite difference resistance obtained by differentially combining said resistance variations of the two magnetoresistive elements, wherein said recorded patterns include magnetization transitions at corresponding positions in said magnetic recording medium, said transitions including a zero cross point, said output of said generating means comprising a waveform having different directions of inclination, said apparatus further comprises detecting means responsive to said output of said generating means for detecting the position of magnetization transition of the recorded pattern on the magnetic recording medium from the zero cross point and for detecting the direction of inclination of the waveform of the output, wherein said detecting means includes first means for detecting a positive peak in said waveform, second means for detecting a negative peak in said waveform, third means for detecting zero cross points of said waveform and issuing a zero cross point signal, and gate means responsive to said positive peak detection for passing said zero cross point signal and responsive to said negative peak detection for inhibiting said zero cross point signal.

8. A magnetic recorded information reproducing apparatus for reproducing information in accordance with recorded patterns spaced apart on a magnetic recording medium by a minimum spacing, said apparatus comprising:

two magnetoresistive elements having resistance values which vary in accordance with an external magnetic field intensity, and which are disposed in parallel to the direction of said patterns recorded on said magnetic recording medium, and which are spaced apart from each other by a distance shorter than said minimum spacing of the patterns;

insulator means, one for each of the two magnetoresistive elements, each insulator means surrounding its respective magnetoresistive element for insulating same; and magnetic shields respectively disposed between said insulator means and on that respective side of each of said insulator means remote from the other insulator means;

said apparatus further comprising generating means connected to said two magnetoresistive elements and responsive to resistance variations of the two magnetoresistive elements for generating an output proportional to a composite difference resistance obtained by differentially combining said resistance variations of the two magnetoresistive elements;

said apparatus further including a positioning control circuit for accurately controlling the relative position between said magnetic recording medium and said two magnetoresistive elements in accordance with magnetization transition position detection, said positioning control circuit comprising:

digital control means responsive to said output of said generating means for producing a digital control output including at least a magnetization transition position detection signal;

analog control means responsive to said output of said generating means for producing an analog control output;

amplifier means responsive to said digital control output and said analog control output, respectively, for producing a motor control signal; and motor means responsive to said motor control signal for controlling the relative position between said magnetic recording medium and said two magnetoresistive elements in accordance with magnetization transition position detection.

9. A magnetic recorded information reproducing apparatus according to claim 8, wherein said digital control means includes:
- a level comparator responsive to said output of said generating means for producing first, second and third signals indicating, respectively, positive peaks, negative peaks and zero cross points in said waveform of said output of said generating means;
- a gate generator responsive to said first and second signals for producing a fourth signal whenever said waveform assumes an inclination of a first direction, and a fifth signal whenever said waveform assumes an inclination of a second direction;
- a pulse generator responsive to said third signal for producing a first pulse train indicating zero cross points during a first one of said inclinations of said waveform, and a second pulse train indicating zero cross points during a second one of said inclinations of said waveform;
- a gate circuit responsive to said fourth and fifth signals from said gate generator, and to said first and second pulse trains from said pulse generator for producing a direction control signal and a magnetization transition detecting pulse train; and
- a processing circuit responsive to said direction control signal and said magnetization transition detecting pulse train for providing said digital control signal.

10. A magnetic recorded information reproducing apparatus according to claim 9, wherein said processing circuit also provides an analog control gate signal, said analog control means comprising an error signal generator responsive to said output of said generating means and to said analog control gate signal for determining a level difference between said output of said generating means and a predetermined level so as to develop an error voltage, said error signal generator being responsive to said analog control gate signal for supplying said error voltage to said amplifier means.

* * * * *

UNITED STATES PATENT AND TRADEMARK OFFICE
CERTIFICATE OF CORRECTION

PATENT NO. : 4,179,720
DATED : December 18, 1979
INVENTOR(S) : Yoshimasa Miura

It is certified that error appears in the above-identified patent and that said Letters Patent are hereby corrected as shown below:

*Column 2, line 45, "diagram" should be -- diagrams --;

Column 3, line 33, "May" should be -- Many --;

Column 5, line 28, "This" should be -- That --.

Signed and Sealed this

Tenth Day of June 1980

[SEAL]

Attest:

SIDNEY A. DIAMOND

Attesting Officer

Commissioner of Patents and Trademarks